US012195319B2

(12) United States Patent
Pasetto et al.

(10) Patent No.: US 12,195,319 B2
(45) Date of Patent: Jan. 14, 2025

(54) DISPENSING DEVICE FOR CONTAINERS, PREFERABLY FLEXIBLE CONTAINERS FOR LIQUIDS, AND ASSEMBLY COMPRISING A CONTAINER AND SAID DEVICE

(71) Applicant: ITAP INTERNATIONAL S.R.L., Grumolo delle Abbadesse (IT)

(72) Inventors: Siro Pasetto, Creazzo (IT); Paolo Lobba, Marostica (IT)

(73) Assignee: ITAP INTERNATIONAL S.R.L., Grumolo delle Abbadesse (IT)

( * ) Notice: Subject to any disclaimer, the term of this patent is extended or adjusted under 35 U.S.C. 154(b) by 0 days.

(21) Appl. No.: 18/013,701

(22) PCT Filed: Jul. 2, 2021

(86) PCT No.: PCT/IB2021/055945
§ 371 (c)(1),
(2) Date: Dec. 29, 2022

(87) PCT Pub. No.: WO2022/023838
PCT Pub. Date: Feb. 3, 2022

(65) Prior Publication Data
US 2023/0348257 A1 Nov. 2, 2023

(30) Foreign Application Priority Data
Jul. 31, 2020 (IT) ........................ 102020000018889

(51) Int. Cl.
*B67D 3/00* (2006.01)
*B67D 3/04* (2006.01)
*A47K 5/12* (2006.01)

(52) U.S. Cl.
CPC ................ *B67D 3/045* (2013.01); *A47K 5/12* (2013.01)

(58) Field of Classification Search
CPC ........ B67D 3/043; B67D 3/045; B67D 3/047; A47K 5/12; B65D 77/067
(Continued)

(56) References Cited

U.S. PATENT DOCUMENTS 1,912,304 A * 5/1933 Clive ..................... B67D 3/045 251/351
1,924,057 A * 8/1933 Draper ................... B67D 3/047 222/509
(Continued)

FOREIGN PATENT DOCUMENTS

WO WO 01/32551 A1 5/2001

*Primary Examiner* — Charles P. Cheyney
(74) *Attorney, Agent, or Firm* — Birch, Stewart, Kolasch & Birch, LLP

(57) ABSTRACT

The present invention concerns a dispensing device (20; 120; 220; 320; 420; 520) for a container (12). The device (20; 120; 220; 320; 420; 520) comprises an outlet mouth (22) for the product to be dispensed and comprises a first hollow body (24) suited to define a first passage channel (26) for the product and a second body (32; 232; 532) that is movable with respect to the first body (24) and can be positioned in a first position suitable for closing the device (20; 120; 220; 320; 420; 520) and in at least one second position suitable for dispensing the product from the outlet mouth (22). The outlet mouth (22) is defined in the second body (32; 232; 532) and the outlet mouth (22) communicates with a second passage channel (34) for the product defined in the second body (32; 232; 532). The second body (32; 232; 532) comprises a plugging portion (36; 536) suited to close the first passage channel (26) of the first body (24) when the second body (32; 232; 532) is in the first closing position and suited to open the first passage channel (26) when the second body (32; 232; 532) is in the second position.

17 Claims, 16 Drawing Sheets

(58) Field of Classification Search
USPC .......................... 222/523, 522, 518, 519, 549
See application file for complete search history.

(56) References Cited

U.S. PATENT DOCUMENTS

| | | | | | |
|---|---|---|---|---|---|
| 3,173,579 | A * | 3/1965 | Curie | B65D 75/5877 | 222/105 |
| 3,203,665 | A * | 8/1965 | Grant | B65D 47/063 | 251/351 |
| 3,493,146 | A * | 2/1970 | Conners | B65D 47/283 | 222/523 |
| 4,440,316 | A * | 4/1984 | Christine | B65D 75/5877 | 222/83.5 |
| 4,516,691 | A * | 5/1985 | Christine | B67B 7/26 | 222/522 |
| 4,742,851 | A * | 5/1988 | Lundblade | B67D 3/045 | 137/614.19 |
| 4,979,655 | A * | 12/1990 | Gallucci | B65D 47/263 | 222/548 |
| 4,997,108 | A * | 3/1991 | Hata | B67D 3/043 | 251/351 |
| 5,100,033 | A * | 3/1992 | Cho | B67D 3/043 | 222/523 |
| 6,053,475 | A * | 4/2000 | Batschied | B67D 3/045 | 251/351 |
| 6,314,984 | B1 * | 11/2001 | Barriendos | F16K 15/205 | 251/351 |
| 6,401,752 | B1 * | 6/2002 | Blackbourn | B67D 3/044 | 137/589 |
| 6,742,682 | B2 * | 6/2004 | Batschied | B67D 3/045 | 251/351 |
| 9,862,533 | B2 * | 1/2018 | Stever | B65D 77/067 | |
| 10,280,062 | B2 * | 5/2019 | Stever | B67B 7/24 | |

* cited by examiner

DISPENSING DEVICE FOR CONTAINERS, PREFERABLY FLEXIBLE CONTAINERS FOR LIQUIDS, AND ASSEMBLY COMPRISING A CONTAINER AND SAID DEVICE

CROSS REFERENCE TO RELATED APPLICATIONS

This application is the National Phase of PCT International Application No. PCT/IB2021/055945, filed on Jul. 2, 2021, which claims priority under 35 U.S.C. 119 (a) to Patent Application No. 102020000018889, filed in Italy on Jul. 31, 2020, all of which are hereby expressly incorporated by reference into the present application.

TECHNICAL FIELD OF THE INVENTION

The present invention concerns a dispensing device for containers, preferably flexible containers.

More specifically, the present invention concerns a dispensing device for flexible containers that are also called pouches or bags. Even more specifically, the present invention concerns a dispensing device for flexible containers used in the Bag in Box solutions.

The present invention concerns also an assembly comprising a container provided with said dispensing system.

DESCRIPTION OF THE STATE OF THE ART

The use of dispensing devices which are applied to special containers for the product to be dispensed is known in the field of dispensing systems for products, especially for products in the form of fluids.

The dispensing devices of the known type can be operated manually by the user in order to allow the product to be dispensed towards a dispensing mouth when necessary.

In a known type of use, the dispensing devices are associated with collapsible/deformable containers suited to receive the product, also called pouches. Said containers, for example made from plastic or metallized films, are configured to contain edible products such as wines, fruit juices, oils, water, milk etc. or made from plastic material for other sectors, as in the case of the packaging of liquid soaps, shampoos, creams or house cleaning products etc.

In a particular type of use, the containers with their respective dispensing device are of the disposable type and from time to time are inserted in a container, typically made of cardboard, which makes it easier to use them in terms of stability and/or to transport them, in which case they are preferably provided with gripping means directly on the cardboard. These solutions are also known as Bag-in-Box solutions.

The cardboard container is conveniently provided with a hole through which the dispensing mouth and the area for the activation of the device by the user jut out.

The dispensing devices of the known type are made by assembling various components which make it possible to act on an element/valve that opens or closes a way for dispensing the product from the inside of the container towards the dispensing mouth.

The devices of the known type typically comprise a first element fixed to the container and provided with a lower opening (mouth) which is intercepted by convenient valve means suited to be operated by the user, typically through lever systems. The devices of the known type are also typically provided with elastic return elements which are suited to automatically move the closing valve back to the closed position once they have been activated.

During the opening step, the product is dispensed by gravity through the lower mouth of the device.

Other devices of the known type are constituted by rotating taps which typically comprise a first element fixed to the container and provided with a lower opening (mouth) which is intercepted by a second element that is rotated with respect to the first element to open/close said mouth.

The dispensing devices belonging to the state of the art, however, have some drawbacks.

A first drawback of the systems of the known type is constituted by the complexity deriving from the high number of components necessary to make them.

Another drawback of the systems of the known type is related to the fact that it is difficult to use the device, since the user needs to use several fingers of one or both hands to operate the opening means/lever systems.

A further drawback, related especially to rotating taps, lies in that it is necessary to operate them with both hands so as to avoid exerting too much force on the container to which they are connected.

The main object of the present invention is thus to solve or at least partially overcome the problems that characterize the solutions known in the art.

More specifically, it is a first object of the invention to provide a dispensing device which makes it possible to reduce the number of components compared to the systems of the known type.

It is another object of the invention to provide a dispensing device with improved characteristics in terms of ease of use (opening or closing operations), independently of the rigidity-stability of the container to which they are applied.

It is a further object of the invention to provide a dispensing device which makes it possible to reduce the disposal operations/costs after use.

SUMMARY OF THE PRESENT INVENTION

According to a first aspect of the present invention, the same concerns, therefore, a dispensing device for a container, said device comprising an outlet mouth for the product to be dispensed and comprising:

- a first hollow body suited to define a first passage channel for said product and comprising connection means for connection to said container;
- a second body that is movable with respect to said first body and can be positioned in a first position suited to close said device and in at least one second position suited to allow said product to be dispensed from said outlet mouth; wherein said outlet mouth is defined in said second body and said outlet mouth communicates with a second passage channel for said product defined in said second body, and wherein said second body comprises a plugging portion suited to close said first passage channel of said first hollow body when said second body is in said first closing position and suited to open said first passage channel when said second body is in said second position to allow said product to flow along said first passage channel, said second passage channel and said outlet mouth.

Advantageously, a small number of components is needed to make the device.

In a preferred embodiment, the first passage channel extends along a first longitudinal direction and the outlet mouth is positioned in the second body to allow the product to flow out in a dispensing direction that is transverse with respect to the first direction, preferably in a dispensing direction that is perpendicular to the first direction.

According to a preferred embodiment, the second passage channel extends along a second longitudinal direction that is transverse with respect to the first longitudinal direction of the first passage channel. Preferably, said transverse direction is a perpendicular direction.

In a preferred embodiment, the second movable body can be translated with respect to the first body, wherein the second position for dispensing the product is obtained by translating the second movable body in a direction away from the first body and the closing position is obtained by translating the second movable body in a direction towards the first body.

Preferably, the first passage channel and the plugging portion have both at least one section in a matching shape, preferably they both have a cylindrical section.

According to a preferred embodiment, the device comprises means for adjusting the position of the second body with respect to the first body.

Preferably, the adjusting means comprise stop means suited to stop the movement of the second body with respect to the first body.

In a preferred embodiment, the device comprises means for guiding the translation movement of the second body with respect to the first body.

Preferably, the device comprises anti-rotation means suited to prevent the rotation of the second body with respect to the first body.

According to a preferred embodiment, the second body can be rotated with respect to the first body.

Advantageously, it is possible to adjust the product dispensing direction as desired.

In a preferred embodiment, the device comprises first manual gripping means associated with the second body and suited to favour the translation of the second body with respect to the first body activated by a user. Preferably, said first gripping means comprise at least one projecting portion of the second body, more preferably one or more tabs projecting circumferentially from said second body.

In a preferred embodiment, the device comprises second manual gripping means associated with the first body and suited to make it easier for a user to hold the first body when the second body is moved with respect to the first body. Preferably, the second gripping means comprise at least one projecting portion of the first body, more preferably one or more tabs projecting circumferentially from the first body.

According to a preferred embodiment, the plugging portion comprises at least one elastically yielding portion and at least one radial opening, wherein said at least one radial opening allows the product to flow along the first passage channel, said at least one radial opening, the second passage channel and the outlet mouth when the second body is in the second position.

According to a preferred embodiment, the device furthermore comprises an intermediate connection element suited to be interposed between the first body and the container.

According to a second aspect of the present invention, the subject of the same includes a system for dispensing a product, comprising a container for said product and a device for dispensing said product, wherein the device is made as described above.

In a preferred embodiment, the container is flexible.

Preferably, the product is constituted by a fluid, more preferably a liquid.

BRIEF DESCRIPTION OF THE DRAWINGS

Further advantages, objects and characteristics, as well as further embodiments of the present invention are defined in the claims and are illustrated below by means of the following description with reference to the attached drawings; in the drawings, corresponding or equivalent characteristics and/or component parts of the present invention are identified by the same reference numbers. In particular, in the figures:

DETAILED DESCRIPTION OF THE PRESENT INVENTION

While the following description related to the figures illustrates specific embodiments of the present invention, it is clear that the present invention is not limited to these particular embodiments but, on the contrary, the particular embodiments described here below clarify different aspects of the present invention, the object and the scope of which are defined in the claims.

The preferred examples of embodiment of the invention described here below can be applied especially in systems for dispensing edible liquid products, for example wines, fruit juices, oils, water, milk etc.

Clearly, the proposed solutions can be applied also to systems intended for other types of products, for example liquid soaps, shampoos, creams or house cleaning products etc.

The product is preferably in the liquid or fluid form but, in other cases, the product can be constituted by powders and/or solids, for example detergents in the form of powder or microgranules.

A non-limiting example of embodiment of a dispensing system according to the present invention, comprising a flexible container, is shown in the FIG. 1 to 4.

In particular, the dispensing system, indicated as a whole by number 10, comprises a container 12 and a dispensing device 20, which is also the subject of the present invention.

FIGS. 5 to 14 show the dispensing device 20 isolated from the container 12.

Figure 1:
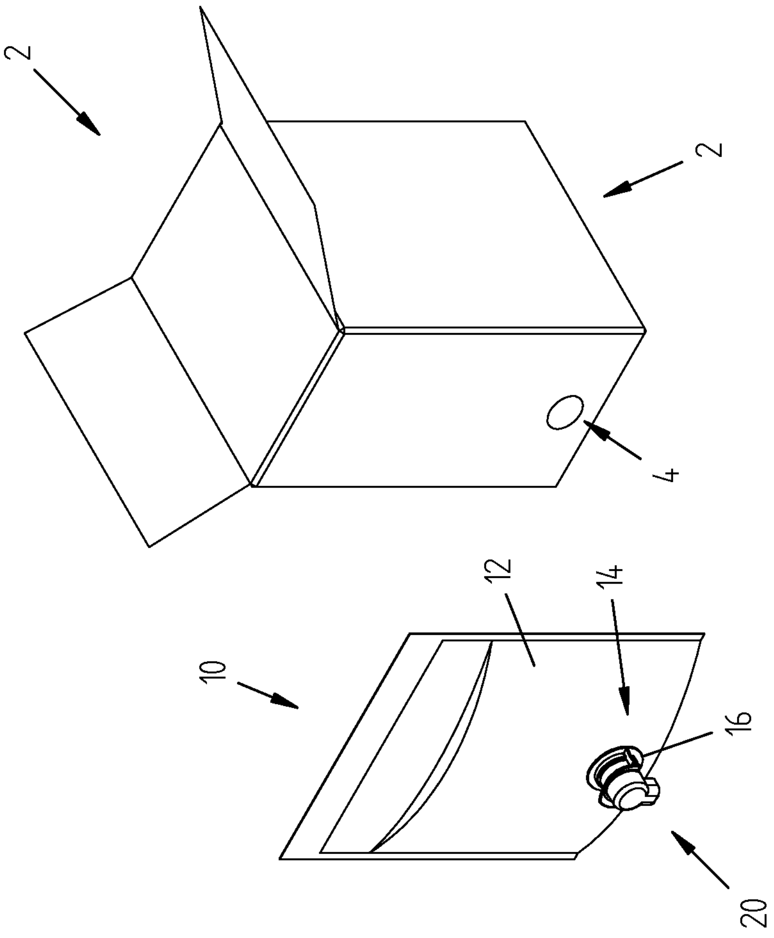
FIG. 1 shows an axonometric view of a preferred embodiment of the dispensing device of the invention and the dispensing system comprising said device in a possible configuration suitable for use in a Bag in Box solution.
Figure 2:
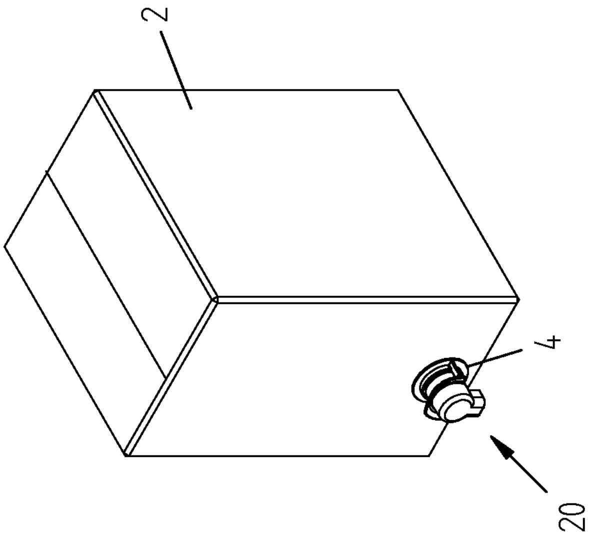
FIG. 2 shows the Bag in Box solution of FIG. 1 during use.
Figure 4:
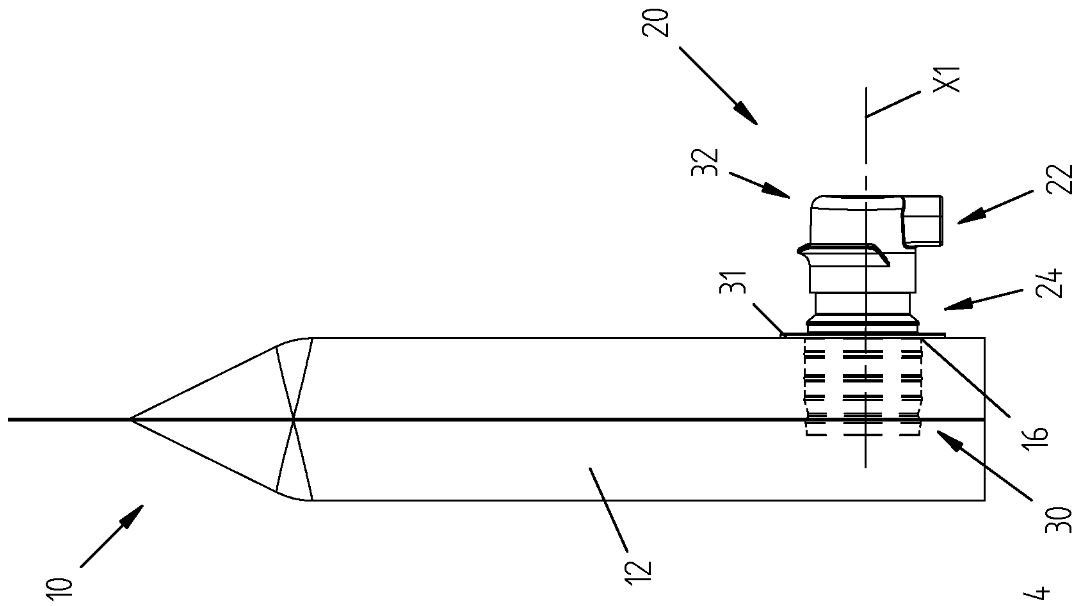
FIG. 4 shows the dispensing system of FIG. 3 with the dispensing device in a second open operating position.
Figure 3:
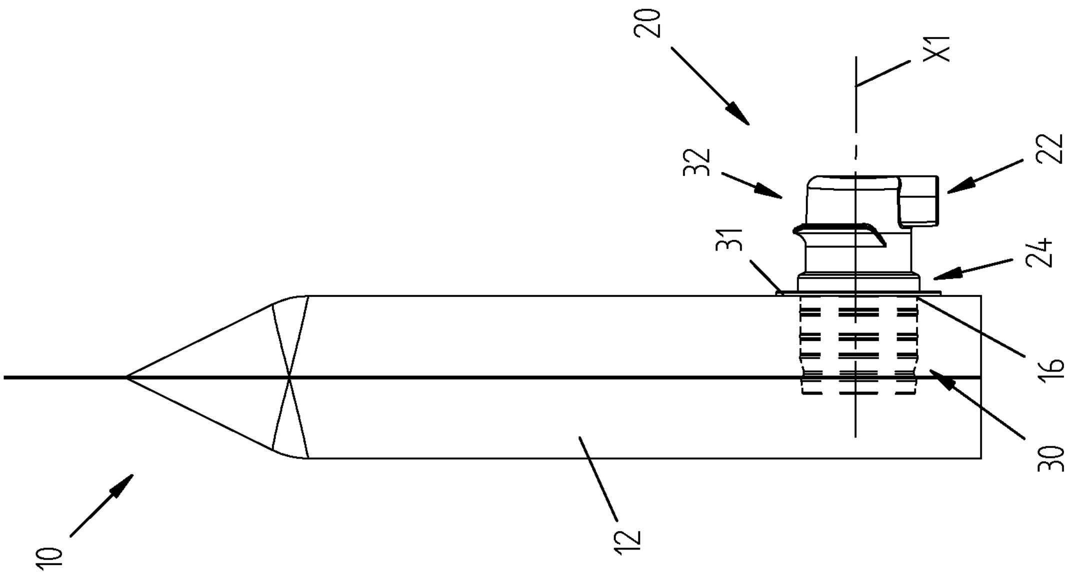
FIG. 3 shows a side view of the dispensing system of FIG. 1 with the dispensing device in a first closed operating position.
Figure 5:
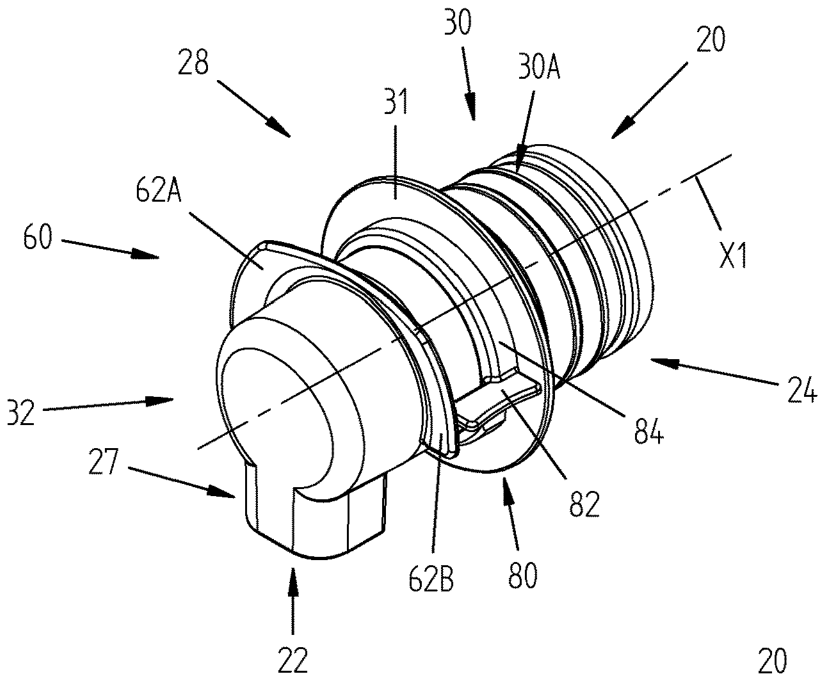
FIG. 5 shows the dispensing device of FIG. 1 isolated from the rest in a first closed operating position.
Figure 6:
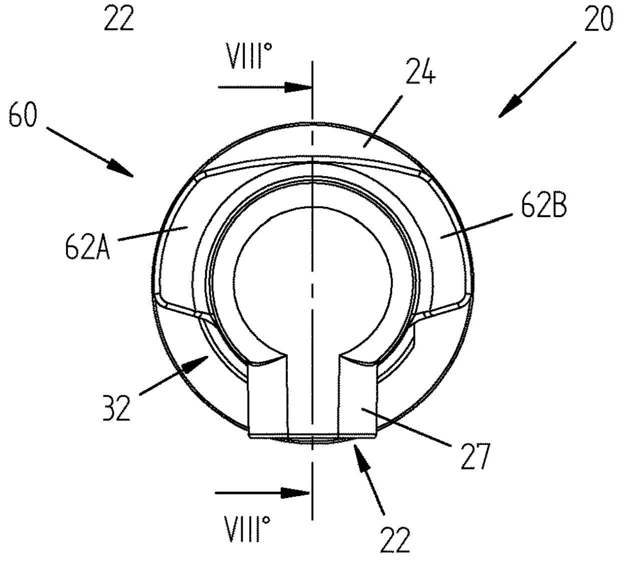
FIG. 6 shows a front plan view of the device of FIG. 5.
Figure 7:
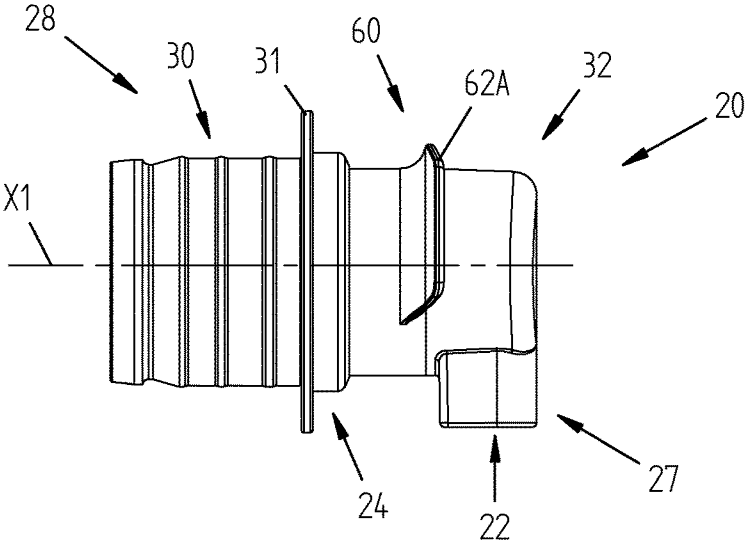
FIG. 7 shows a side plan view of the device of FIG. 5.

Then, FIGS. 1 and 2 show the dispensing system 10 in a particular configuration of use, known as Bag in Box solution. In this solution, the dispensing system 10, typically of the disposable type, is preferably inserted in a container 2, typically made of cardboard, which makes the system 10 easier to use in terms of stability and/or makes it easier to transport.

The container 2 is conveniently provided with a hole 4 through which part of the dispensing device 20 juts out.

The container 2 can be preferably provided with gripping means, not shown, for example created directly on the cardboard or applied externally (handles).

Clearly, the dispensing system 10 can be used also independently, that is, not inserted in any container 2, to obtain a so-called pouch system.

The container 12 is preferably of the flexible type and is suited to become deformed/compressed as the product is dispensed towards the outside.

In a preferred embodiment, the container 12 is made with a metallized film and is suited to contain edible products. The material can be of a different type and preferably suitable for the type of product to be dispensed, for example a plastic material in the case of liquid soaps, shampoos, creams or house cleaning products.

The dispensing device 20 according to the invention represents a device suited to be applied to the container 12 and to be operated manually by an operator to dispense the product.

Preferably, the dispensing device 20 according to the invention, hereinafter simply referred to as device 20, comprises an outlet mouth 22 and is configured to assume a first closed operating position and at least one second position for dispensing the product, or open position.

More preferably, as is better described below, the device 20 according to the invention can be operated to be placed in the closed operating position or in the open position through a forward-backward rectilinear translation movement, preferably along an axis, meaning through a push-pull operation pattern.

The device 20 according to the invention preferably comprises a first hollow body 24 suited to define a first passage channel 26 for the product to be dispensed.

The first passage channel 26 preferably extends along a first longitudinal direction X1.

The first hollow body 24 is preferably provided with connection means 28 for connecting the first body 24 and the device 20 to the container 12.

The connection means 28 preferably make it possible to connect the first body 24 at the level of a dedicated area 14 of the container 12, preferably a lower area 14 of the container 12 with respect to the normal position of use of the assembly 10. Said area 14 is provided with an opening 16.

According to the preferred embodiment shown in the figures, the connection means 28 comprise an external portion 30 of the first hollow body 24 suited to be inserted in the opening 16 of the container 12 and at least one flange 31 suited to be placed in contact with the surface of the container 12. Preferably, the gluing means guarantee the firm connection of the first body 24 to the container 12.

The gluing means, for example, use gluing substances. Alternatively, the connection is obtained through heat welding or ultrasonic welding.

The external portion 30 preferably comprises ribs 30A.

The external portion 30 is inserted in the container 12 to a predetermined extent.

In a preferred embodiment, the external portion 30 can be provided with radial openings to favour the passage of the product into the first hollow body 24.

In a further preferred embodiment, the external portion 30 can be shorter or even minimal and substantially flush with the container 12.

The device 20 comprises also a second body 32 which is movable with respect to the first body 24. The second body 32 can be preferably positioned in a first position to close the device 20, as shown in FIGS. 3, 5, 6, 7, 8 and in at least one second position, or open position, to dispense the product from the outlet mouth 22, as shown in FIGS. 4, 9, 10, 11, 12. Preferably, the second movable body 32 can be translated with respect to the first body 24 in a direction away from the first body 24 so as to reach the open position and, vice versa, the second movable body 32 can be translated with respect to the first body 24 in a direction towards the first body 24 to reach the closed position, according to a push-pull operation pattern.

Preferably, the translation of the second movable body 32 with respect to the first body 24 takes place along a rectilinear direction, more preferably along a direction which is parallel to or coincides with the first longitudinal direction X1 of extension of the first passage channel 26.

The device 20 preferably comprises adjusting means 70 for adjusting the position of the second body 32 with respect to the first body 24.

The adjusting means 70 preferably comprise one or more elements 25A, 25B projecting outwards from the first body 24 and at least one element 33A projecting inwards from the second body 32.

The projecting elements 25A, 25B of the first body 24 interact with the projecting element 33A of the second body 32 to allow the mutual positioning of the second body 32 with respect to the first body 24 in predetermined positions. More specifically, said interaction makes it possible to maintain the second body 32 in the closed position with respect to the first body 24 (FIG. 8A) and makes it possible to define the stop position of the second body 32 with respect to the first body 24 in the open position (FIG. 12).

According to a first aspect of the present invention, the outlet mouth 22 of the device 20 is defined in the second body 32 and communicates with a second passage channel 34 for the product, also defined in the second body 32.

Figure 8:
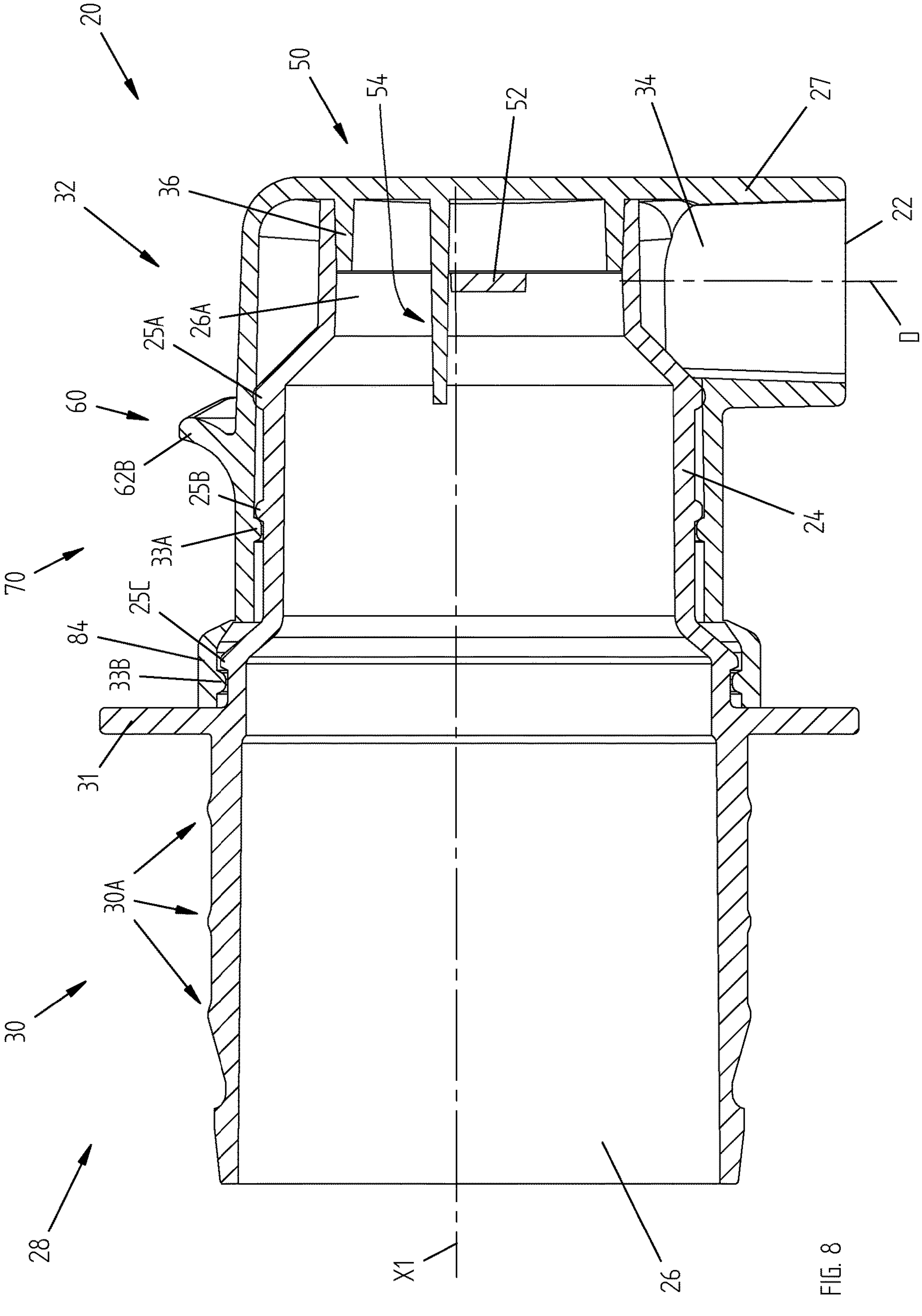
FIG. 8 shows the sectional view along section line VIII°-VIII° of the device of FIG. 6 in the first closed operating position.
Figure 8A:
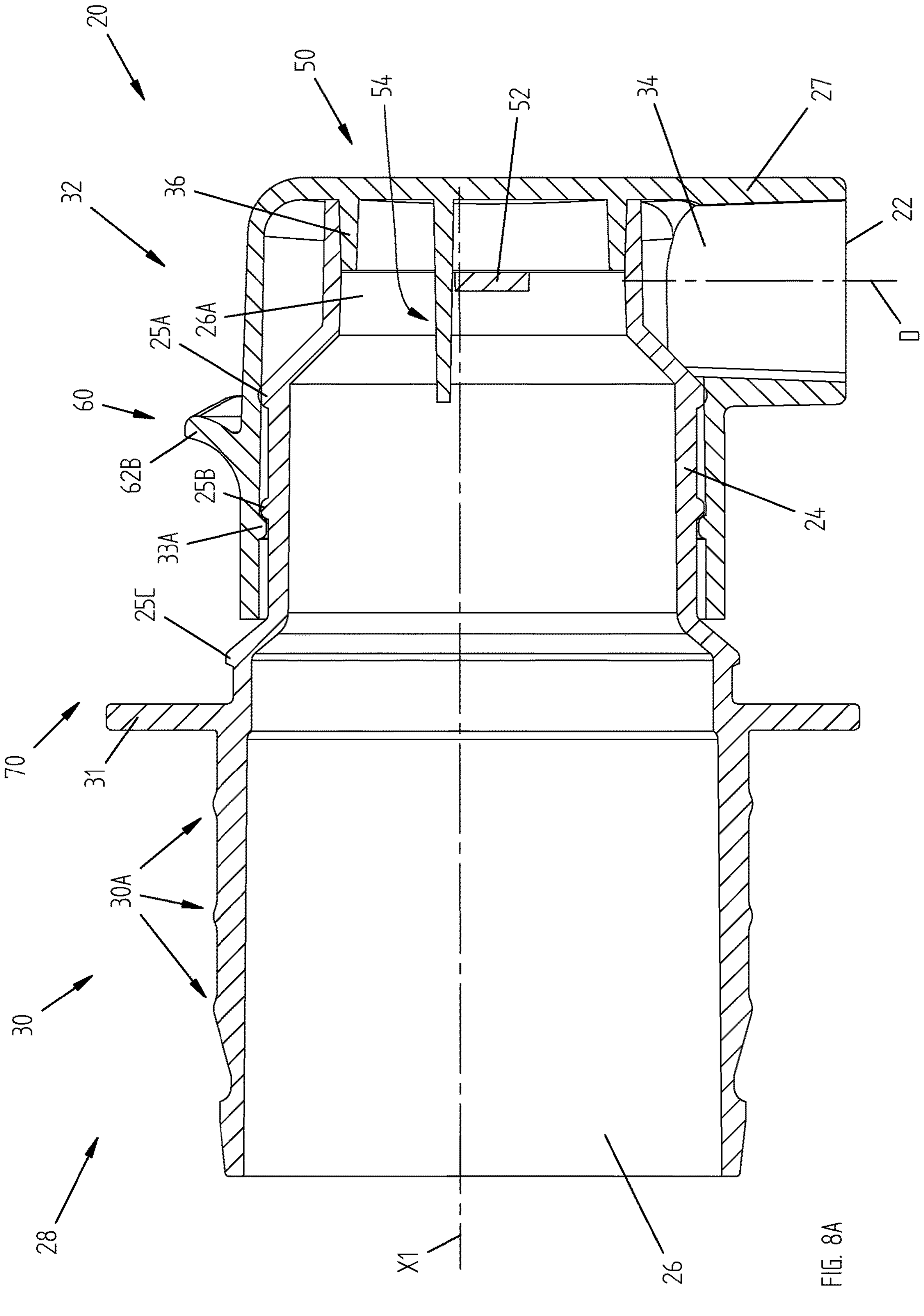
FIG. 8A shows the sectional view of the device of FIG. 6 in the first closed operating position with removed seal.
Figure 9:
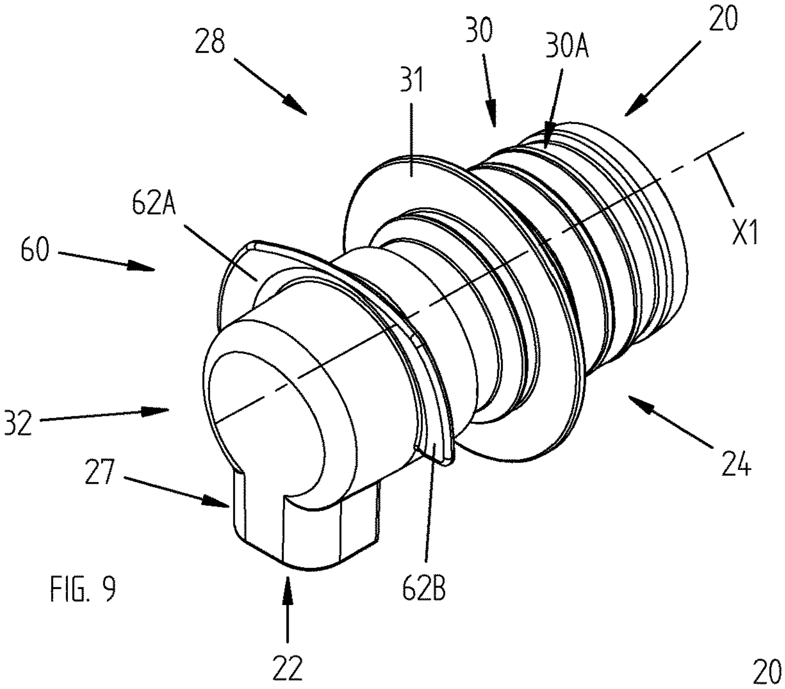
FIG. 9 shows the dispensing device of FIG. 5 in the second open operating position.
Figure 10:
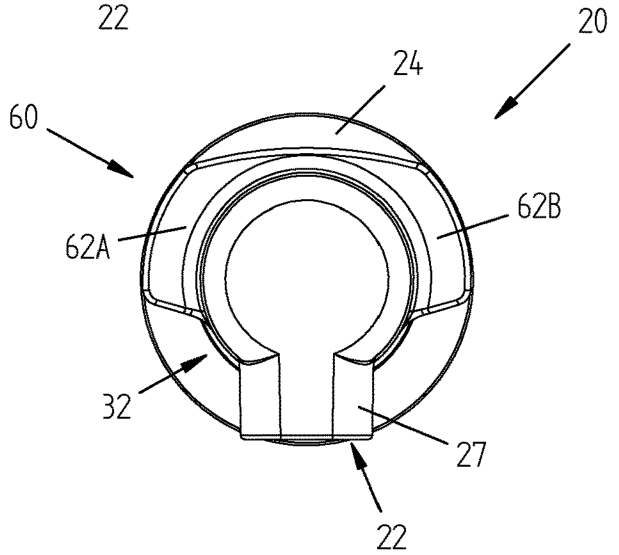
FIG. 10 shows a front plan view of the device of FIG. 9.
Figure 11:
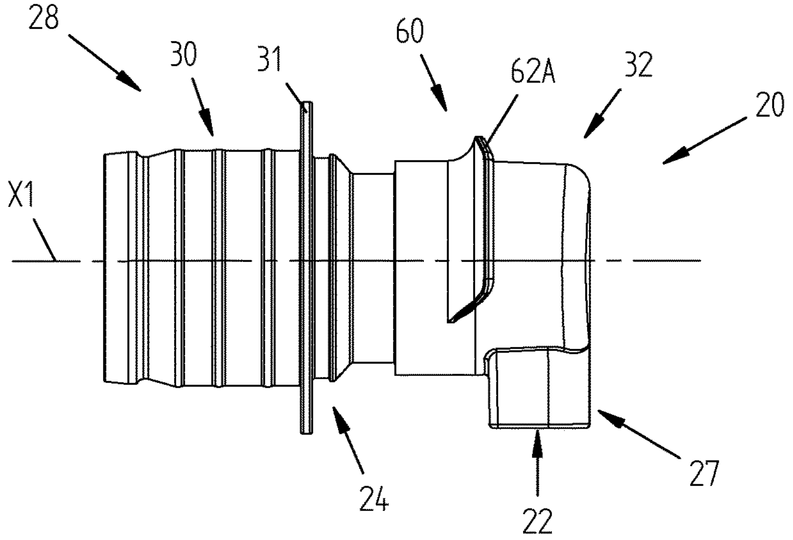
FIG. 11 shows a side plan view of the device of FIG. 9.
Figure 12:
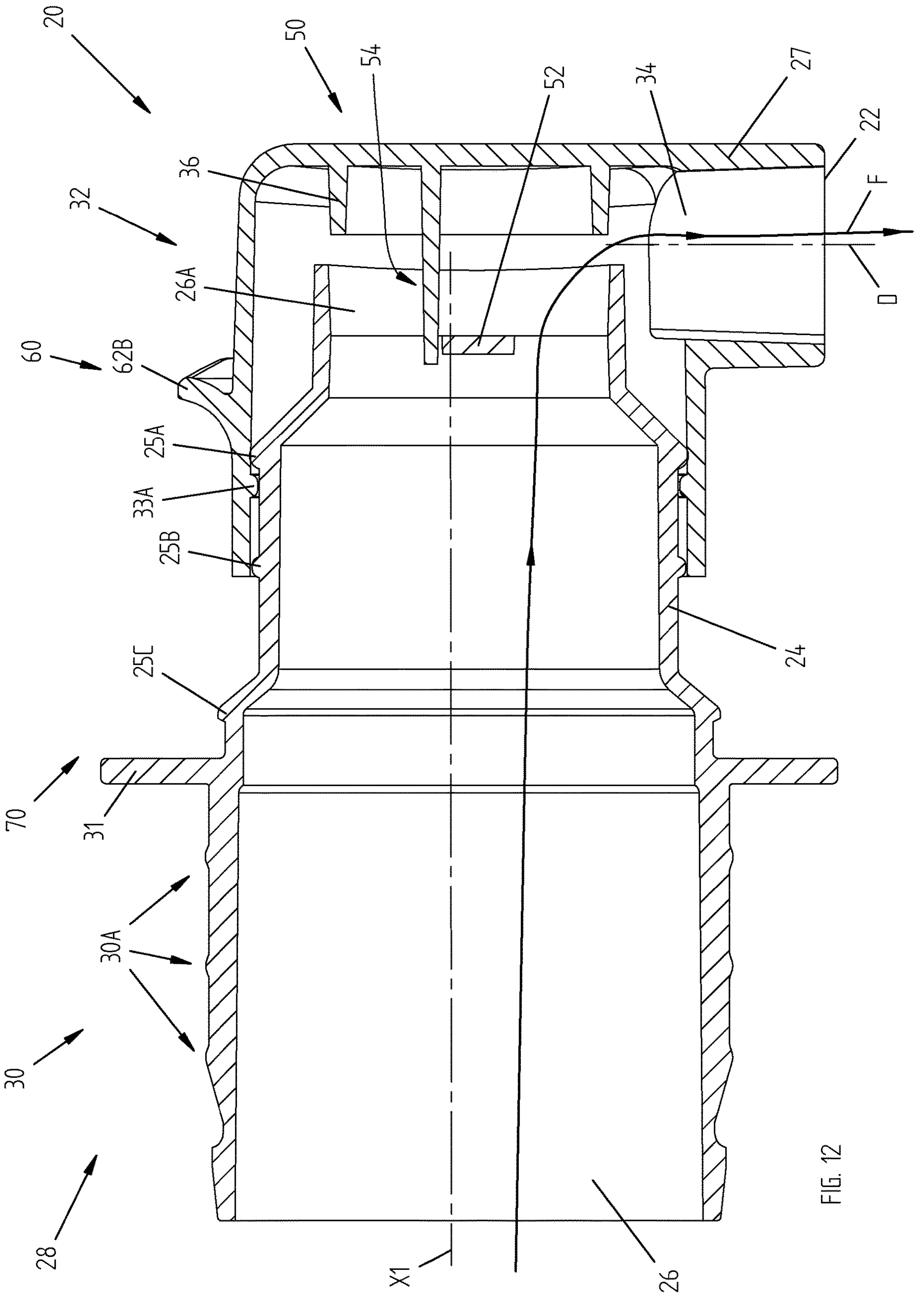
FIG. 12 shows the sectional view along section line XII°-XII° of the device of FIG. 11 in the second open operating position.

According to another aspect of the present invention, the second body 32 comprises a plugging portion 36, better visible in FIGS. 8, 8A and 12.

The plugging portion 36 is suited to close the first passage channel 26 of the first hollow body 24 when the second body 32 is in the closed position (FIG. 8A) and is suited to open the first passage channel 26 when the second body 32 is in the open position (FIG. 12). In said open position, advantageously, the device 20 allows the product to flow through the first passage channel 26, the second passage channel 34 and finally towards the outlet mouth 22, as indicated by the arrow F in FIG. 12.

Preferably, the outlet mouth 22 faces downwards and the product is advantageously dispensed towards the outside by gravity in the moment when, with the translation of the second body 32, the plugging portion 36 clears the first passage channel 26 and places it in communication with the second passage channel 34.

In the closed position, vice versa, the plugging portion 36 penetrates the first passage channel 26 at least partially, preferably penetrates the terminal section 26A of the first passage channel 26.

Preferably, the plugging portion 36 and the terminal section 26A of the first passage channel 26 have complementary shapes, more preferably both have a cylindrical shape, in particular a hollow cylindrical shape.

In general, preferably, the first body 24 and/or the second body 32 have a substantially cylindrical shape, more preferably a hollow cylindrical shape.

Preferably, the outlet mouth 22 is defined at the end of a projecting spout 27 of the second body 32. The second passage channel 34 that joins the first passage channel 26 and the outlet mouth 22 fluidically is at least partially defined inside said spout 27.

Preferably, the dispensing mouth 22 is arranged in such a way as to allow the product to flow out in a transverse direction D with respect to the first longitudinal direction X1, more preferably in a perpendicular direction D with respect to the first longitudinal direction X1.

Analogously, preferably, the second passage channel 34 extends along a second longitudinal direction D transverse to the first longitudinal direction X1, more preferably in a perpendicular direction D with respect to the first longitudinal direction X1.

Figure 13:
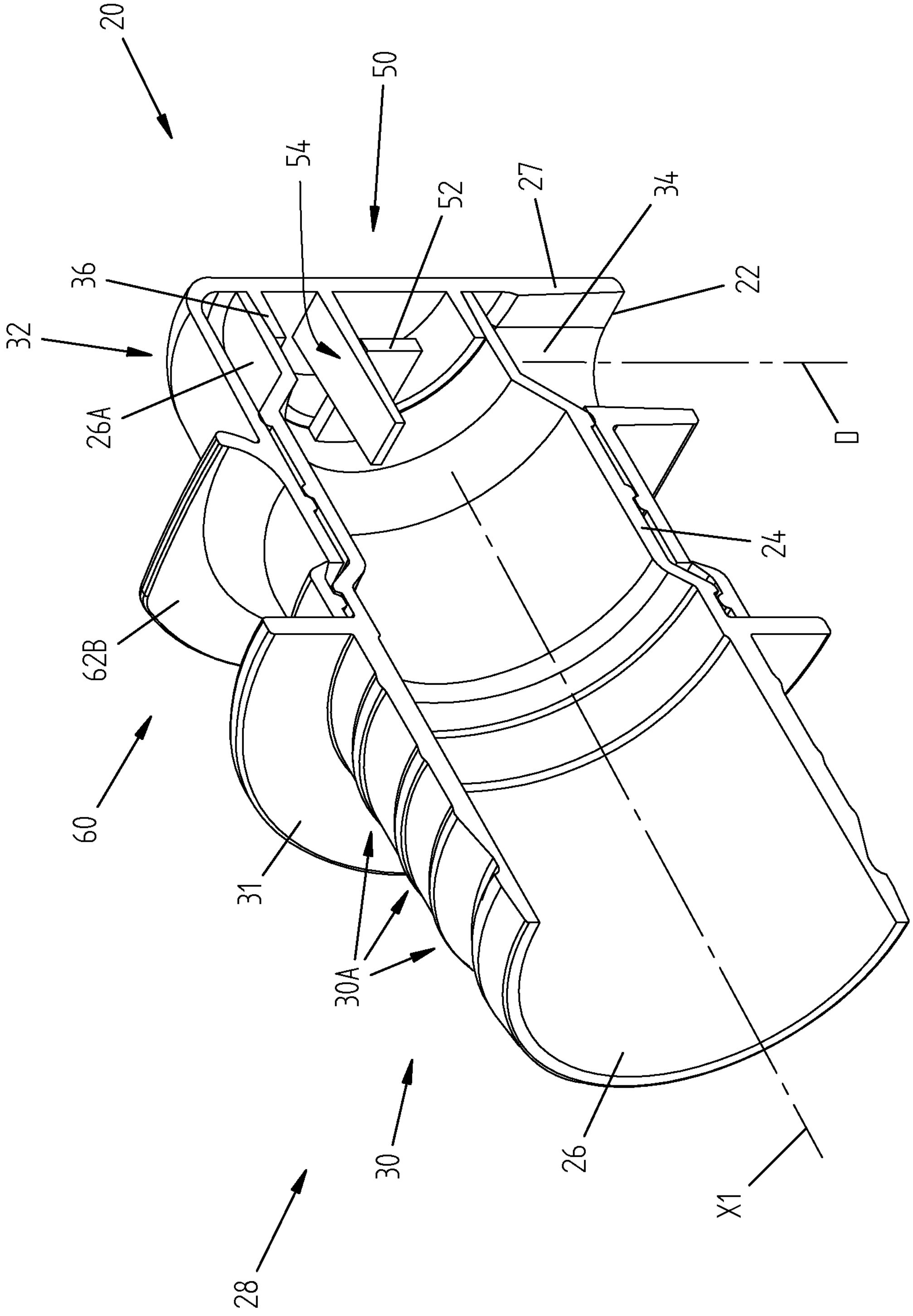
FIG. 13 shows a partial sectional axonometric view of the device of FIG. 5.
Figure 14:
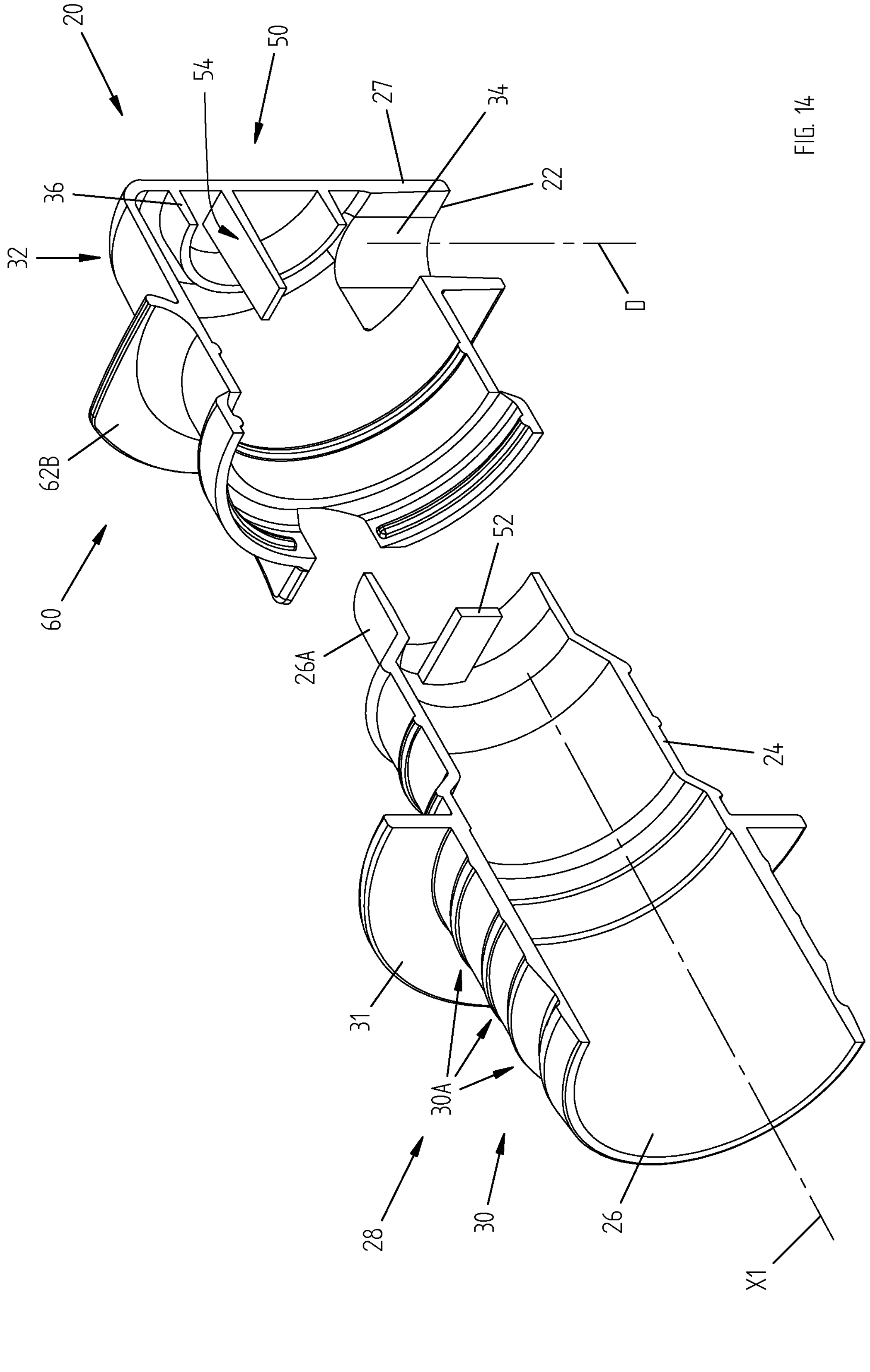
FIG. 14 shows the exploded view of FIG. 13.

In the preferred embodiment, the device 20 comprises guide means 50 suited to guide the movement of the second body 32 with respect to the first body 24, better visible in FIGS. 13 and 14.

The guide means 50 make it possible to guide the movement of the second body 32 with respect to the first body 24 during their mutual translation movement. Furthermore, preferably, the guide means 50 serve as anti-rotation means to prevent the rotation of the second body 32 with respect to the first body 24, so that the position of the projecting spout 27 and the position of the outlet mouth 22 remain fixed at any moment, preferably fixed and facing downwards.

In variant embodiments, the guide means can be absent, as shown for example in the embodiment illustrated in FIG. 21 and described below.

The guide (and anti-rotation) means 50 preferably comprise a first counteracting portion 52 preferably created inside the terminal section 26A of the first passage channel 26 and a second counteracting portion 54 defined at the level of the plugging portion 36.

According to another aspect, the device 20 comprises first manual gripping means 60 associated with the second body 32.

Preferably, the first manual gripping means 60 comprise at least one projecting portion 62A, 62B associated with the second body 32. More preferably, as visible in FIG. 6, the first manual gripping means 60 comprise two projecting portions 62A, 62B which define corresponding gripping tabs.

Advantageously, the first manual gripping means 60 facilitate the operations required to open or close the device 20, when the operator needs to translate the second body 32 with respect to the first body 24, that is, to pull the second body 32 in a direction away from the first body 24 (and from the container 12) or to push the second body 32 in a direction towards the first body 24 (and the container 12). The shape of the projecting portions 62A, 62B makes it easier for the operator to grip the device with his/her fingers.

In variant embodiments, the number and/or the shape of the portions projecting from around the second body can be different from those/that shown in the figures, for example there can be only one projecting portion that extends circumferentially from the second body or three or more separate tabs.

The device 20, furthermore, is preferably provided with a removable locking device 80, or seal (visible in FIGS. 5 and 8), suited to maintain the first body 24 securely connected to the second body 32 in order to prevent, for example, the device 20 from being inadvertently opened and the product from flowing out during transport. The device 20 is preferably made so as to be already provided with said seal 80 and the user must take care to remove it in order to make the device 20 work. The seal 80 preferably comprises a gripping tab 82 and an annular element 84 which are suited to be removed by the user.

The annular element 84, as better visible in FIG. 8, comprises an element 33B which projects inwards and interacts with a respective element 25C which projects outwards from the first body 24.

The device 20 shown in FIG. 8A corresponds to the device 20 shown in FIG. 8 but is without the seal 80 (thus, without the annular element 84).

The description provided above shows that the dispensing device 20 according to the invention makes it possible to use a small number of components for its production, actually just two components, constituted by the first body and the second body 24, 32.

In a preferred embodiment, the first body and the second body 24, 32 are obtained through an injection moulding process, more preferably using materials belonging to the same family, for example polyolefins.

Advantageously, the device is completely made of easily disposable materials. The disposal operations/costs after use are therefore reduced compared to the devices of the known type.

Furthermore, advantageously, the presence of the first manual gripping means makes the device easier to use during the opening or closing operations.

Figure 15:
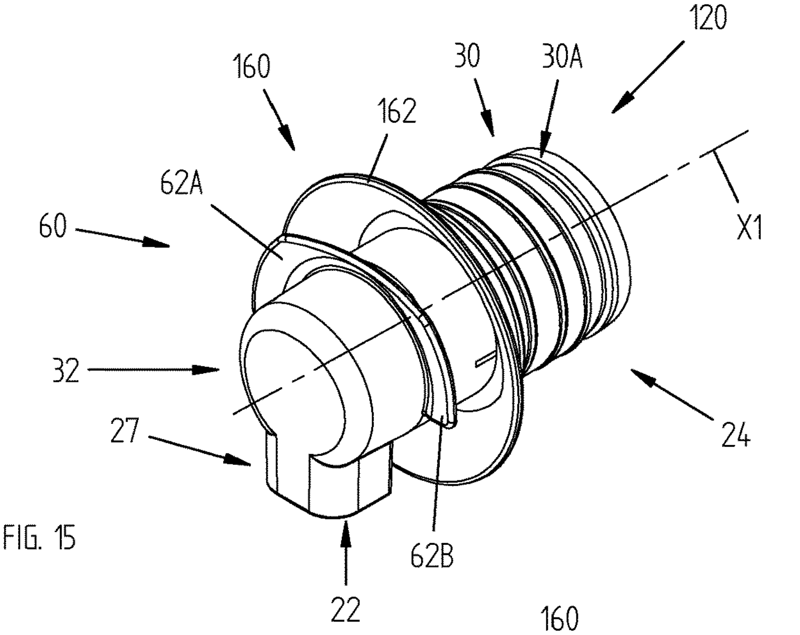
FIG. 15 shows a variant embodiment of the dispensing device of FIG. 5.
Figure 16:
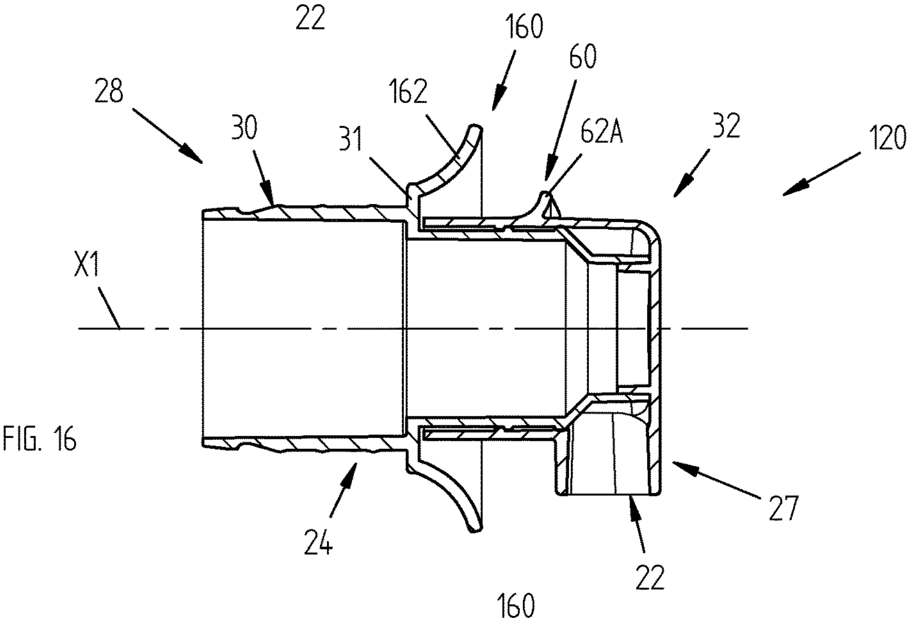
FIG. 16 shows a longitudinal sectional view of the device of FIG. 15 in a first closed operating position.
Figure 17:
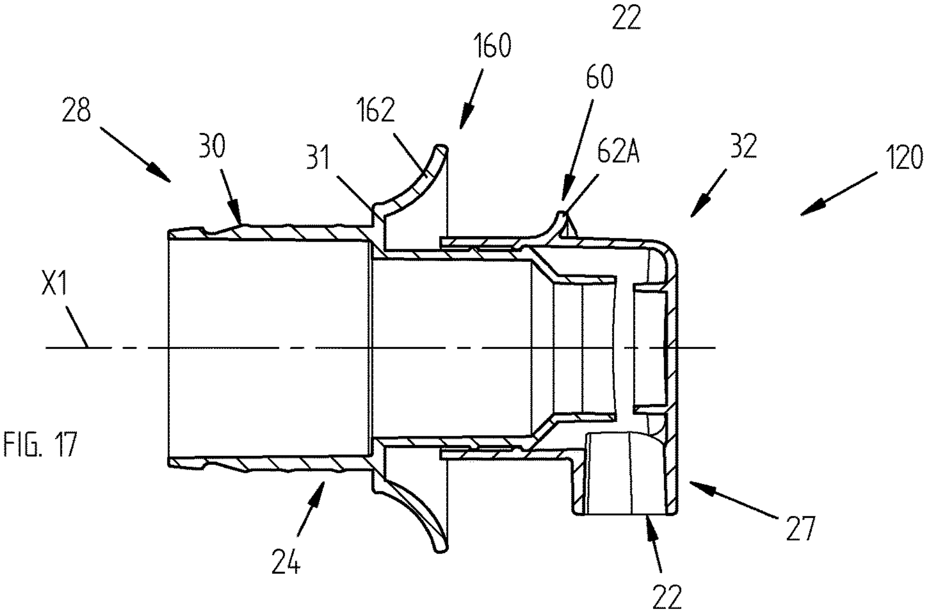
FIG. 17 shows the longitudinal sectional view of the device of FIG. 16 in a second open operating position.

FIGS. 15 to 17 show a variant embodiment of the dispensing device 120 of the invention, which differs from the previous embodiment mainly in that it comprises further gripping means 160, as is better described below.

The component parts equivalent to those of the preferred embodiment previously described are identified by the same reference numbers.

According to an advantageous aspect, in fact, in said embodiment the device 120 comprises second manual gripping means 160 associated with the first body 24. Preferably, the second manual gripping means 160 comprise a projecting portion 162 associated with the first body 24. More preferably, as can be seen in FIG. 15, the second manual gripping means 160 comprise a projecting portion 162 which defines a gripping flange. Preferably, the projecting portion 162 extends circumferentially, completely around the first body 24.

Advantageously, the second manual gripping means 160 further facilitate the operations required to open or close the device 120, when the operator needs to translate the second body 32 with respect to the first body 24. In fact, during the opening operation, when the second body 32 is pulled, the operator at the same time keeps the first body 24 stationary using the second gripping means 160 and, vice versa, during the closing operation, when the second body 32 is pushed, the operator at the same time grips the first body 24 and keeps it stationary using the second gripping means 160.

These operations are particularly advantageous when the containers 12 are of the flexible type. Without the second gripping means 160, which make it possible to hold the first body 24, in fact, the pulling or pushing action on the second body 32 would affect the container 12, deforming it and making it difficult to translate the second body 32 with respect to the first body 24 and/or resulting in the risk of breaking the container 12 or even the risk of the first body 24 coming off the container 12 itself.

In variant embodiments, the second manual gripping means may comprise one or more projecting portions arranged around the first body, for example a projecting portion extending circumferentially and partially around the first body or two or more separate tabs.

It should be noted that this embodiment makes it possible to obtain the same advantages described with reference to the previous embodiment.

Figure 19:
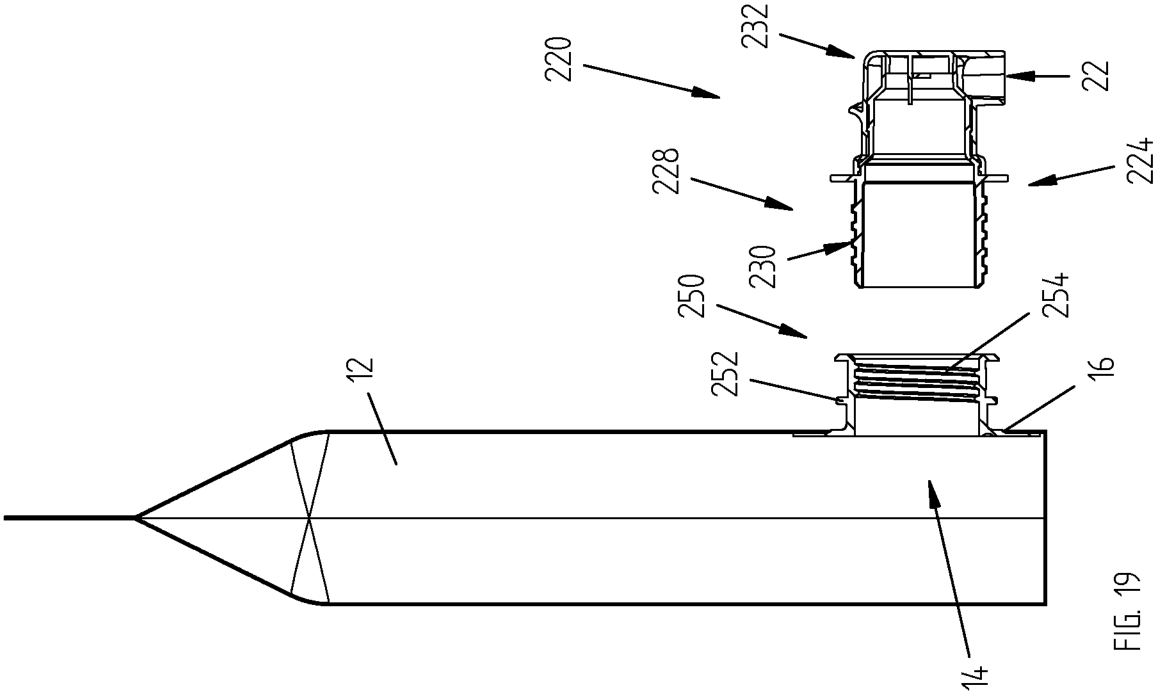
FIG. 19 shows a side plan view of FIG. 18.
Figure 18:
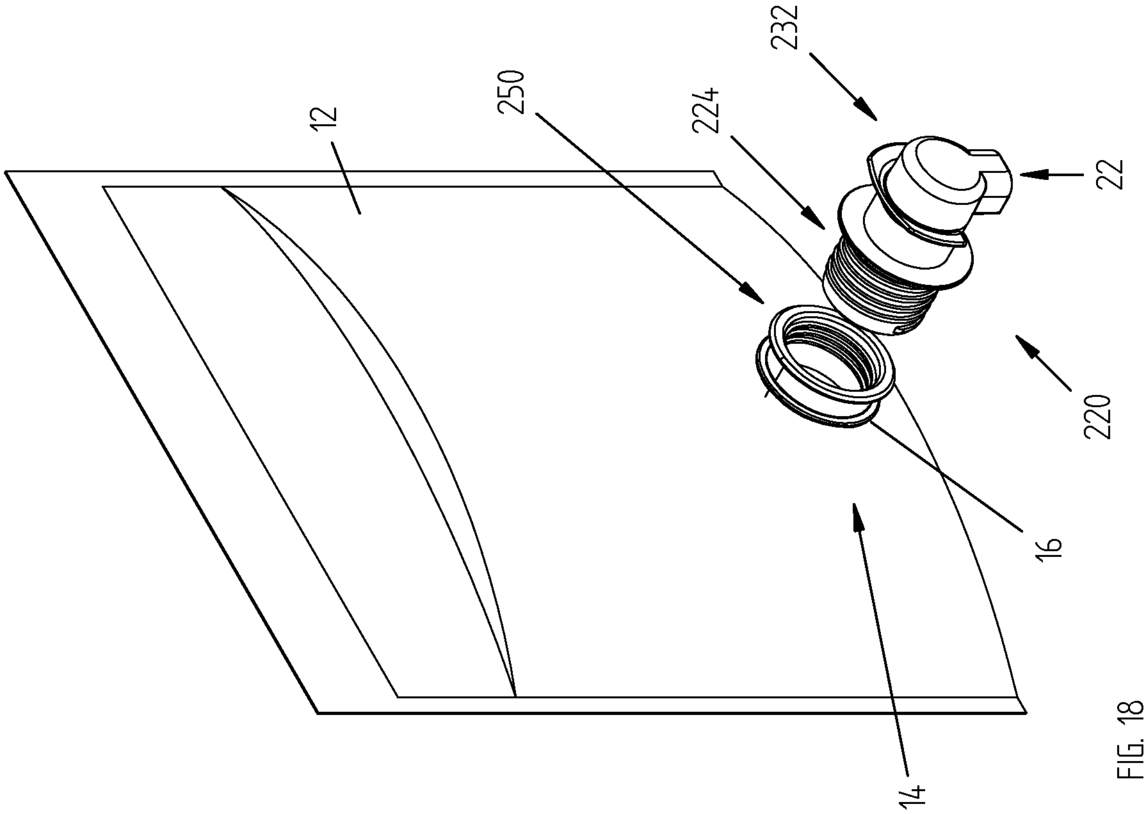
FIG. 18 shows a partially exploded axonometric view of a preferred variant embodiment of the assembly and of the dispensing device of the invention.

FIGS. 18 and 19 show another variant embodiment of the dispensing device 220 of the invention, which differs from the first embodiment described with reference to FIGS. 1 to 14 for the different system used for connection to the container 12.

The component parts equivalent to those of the first embodiment previously described are identified by the same reference numbers.

The dispensing device 220 comprises an intermediate connection element 250 interposed between the first body 224 and the container 12.

The intermediate connection element 250 preferably comprises a hollow body 252 connected to the container 12 on one side and provided with means 254 for receiving the first body 224 on the other side.

The intermediate element 250 is preferably connected to a lower area 14 of the container 12, more preferably at the level of a dedicated opening 16, as previously described.

Preferably, the gluing means guarantee the secure connection of the intermediate element 250 to the container 12.

The gluing means include, for example, the use of gluing substances. Alternatively, the connection is obtained through heat welding or ultrasonic welding.

The receiving means 254 preferably comprise a threaded portion (nut screw).

The first body 224 is preferably provided with connection means 228 suited to connect it to the intermediate element 250. Preferably, the connection means 228 comprise an external threaded portion 230 of the first hollow body 224 suited to be screwed in the corresponding nut screw 254 of the intermediate element 250.

In variant embodiments, the intermediate element and the receiving means can be made in a different way, as well as the connection means associated with the first body.

Figure 20A:
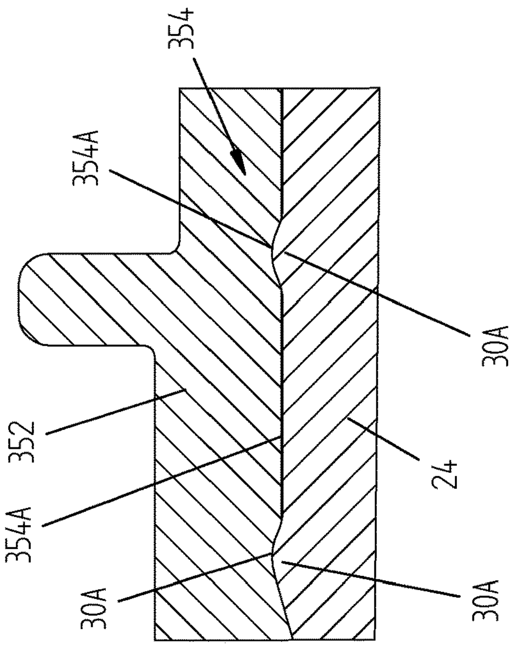
FIG. 20A shows an enlarged detail of FIG. 20.
Figure 20:
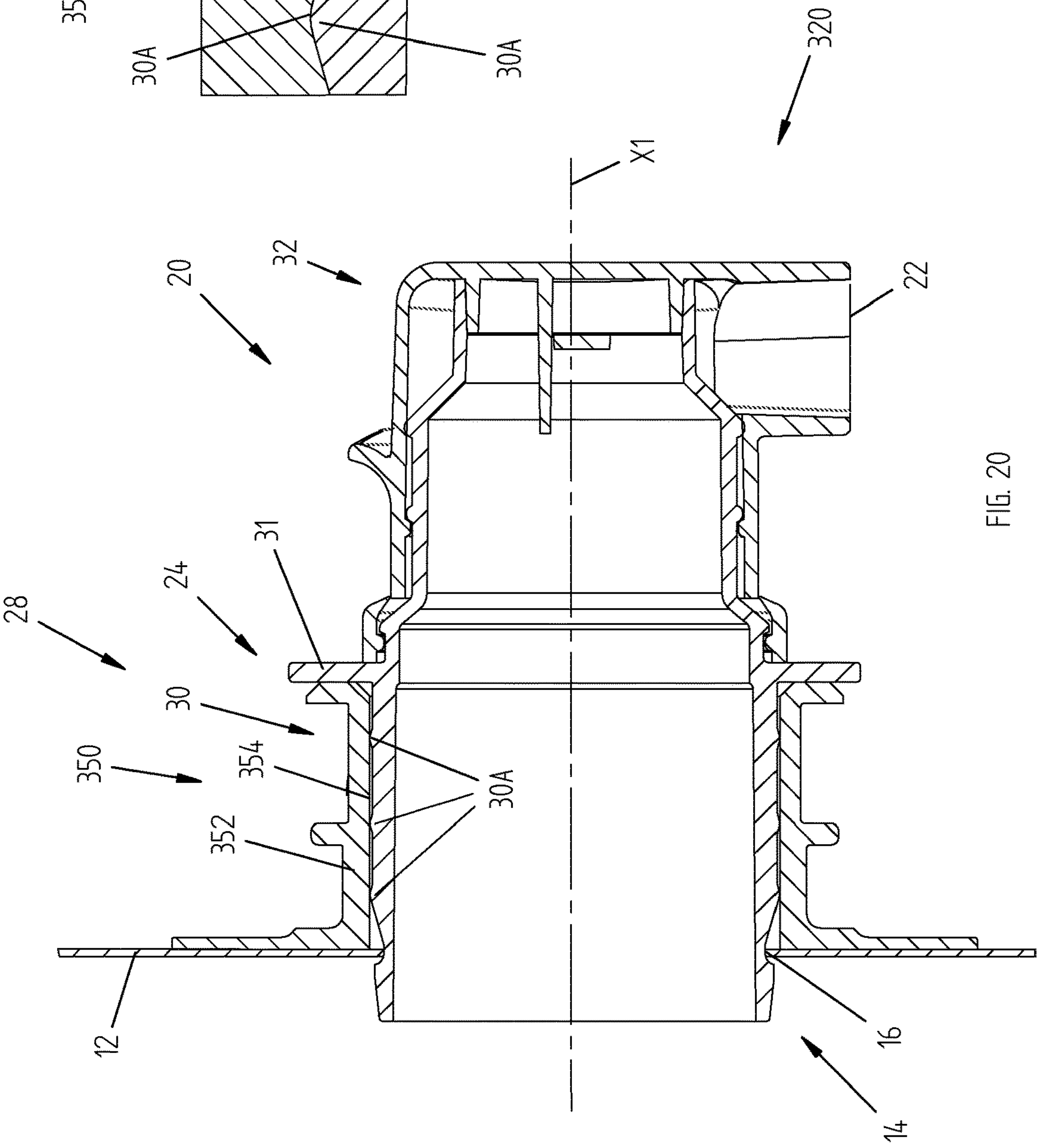
FIG. 20 shows a partial longitudinal sectional view of a dispensing system according to another embodiment of the invention.

FIG. 20 shows such a (possible) variant embodiment of the device 320 according to the invention, meaning a variant embodiment which uses an intermediate connection element 350 interposed between the first body 24 and the container 12.

More specifically, the device 320 in this case comprises the device 20 previously described with reference to FIGS. 1 to 14 with the addition of the intermediate connection element 350 which allows it to be connected to the container 12.

The component parts equivalent to those of the first embodiment previously described are identified by the same reference numbers.

The dispensing device 320 thus comprises an intermediate connection element 350 interposed between the first body 24 and the container 12.

The intermediate connection element 350 preferably comprises a hollow body 352 connected to the container 12 on one side and provided with means 354 for receiving the first body 24 on the other side.

The intermediate element 350 is preferably connected to a lower area 14 of the container 12, more preferably at the level of a dedicated opening 16, as previously described.

Preferably, the gluing means guarantee the secure connection of the intermediate element 350 to the container 12.

The gluing means include, for example, the use of gluing substances. Alternatively, the connection is obtained through heat welding or ultrasonic welding.

The receiving means 354 preferably comprise a hollow cylindrical portion suited to receive the external portion 30 of the first body 24 through a snap-in connection. Preferably, said snap-in connection is obtained by means of recesses 354A defined on the hollow cylindrical portion and suited to receive the respective ribs 30A of the external portion 30 of the first body 24, as shown in the detail represented in FIG. 20A.

In variant embodiments, said connection can be made in a different way, for example through mechanical interference or a bayonet connection system.

Advantageously, the embodiments using an intermediate connection element facilitate the operations required to install/remove the dispensing device on/from the container.

Said embodiments furthermore make it possible to obtain the same advantages already described with reference to the first embodiment.

Figure 21:
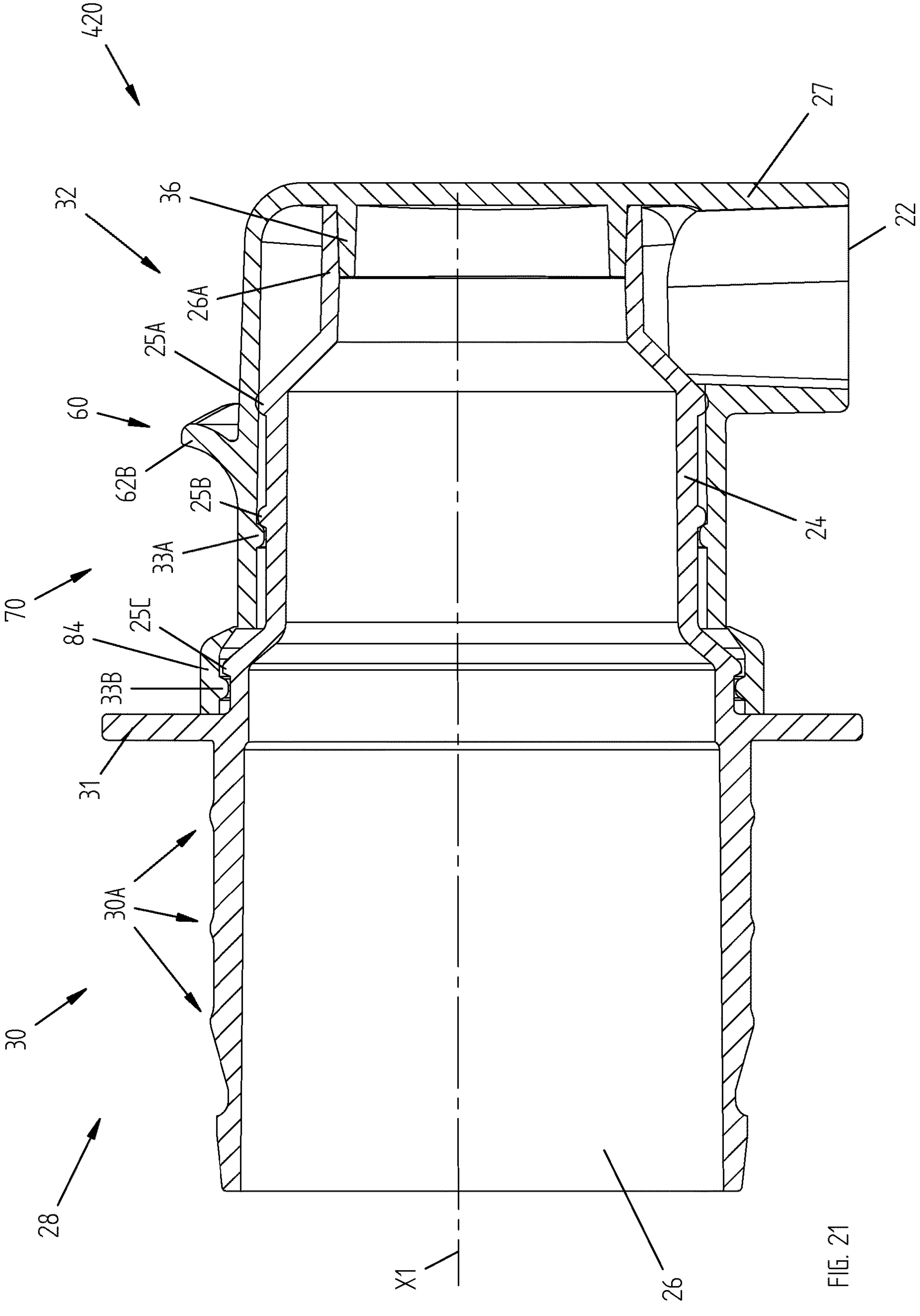
FIG. 21 shows a longitudinal sectional view of a dispensing device according to another variant embodiment of the invention.

FIG. 21 refers to a variant embodiment of the dispensing device 420 of the invention, as mentioned above, which differs from the first embodiment only in that the device 420 is not provided with guide and anti-rotation means.

The component parts equivalent to those of the first embodiment previously described are identified by the same reference numbers.

Therefore, in the illustrated dispensing device 420 the second body 32, in addition to translating with respect to the first body 24, can also rotate. This advantageously makes it possible to modify the dispensing direction of the outlet mouth 22 when the device 420 is in the open position or to rotate the second body 32 to move the spout 27 and the outlet mouth 22 upwards. This may be advantageous when the device 420 is brought to the closed position after the dispensing cycle, to prevent any dropping from the outlet mouth 22.

Figure 22:
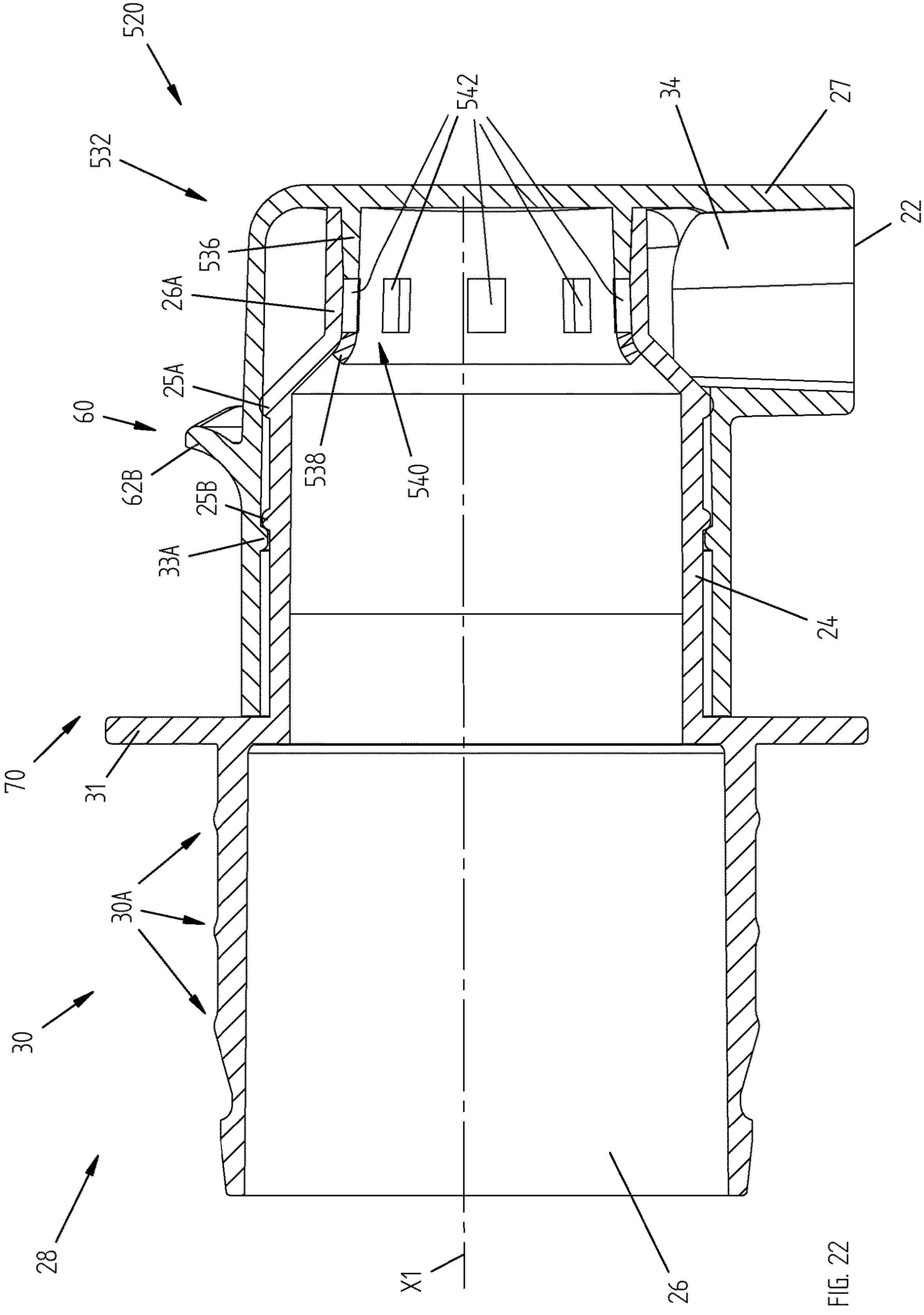
FIG. 22 shows the longitudinal sectional view of a dispensing device according to a further variant embodiment of the invention in the first closed operating position.
Figure 23:
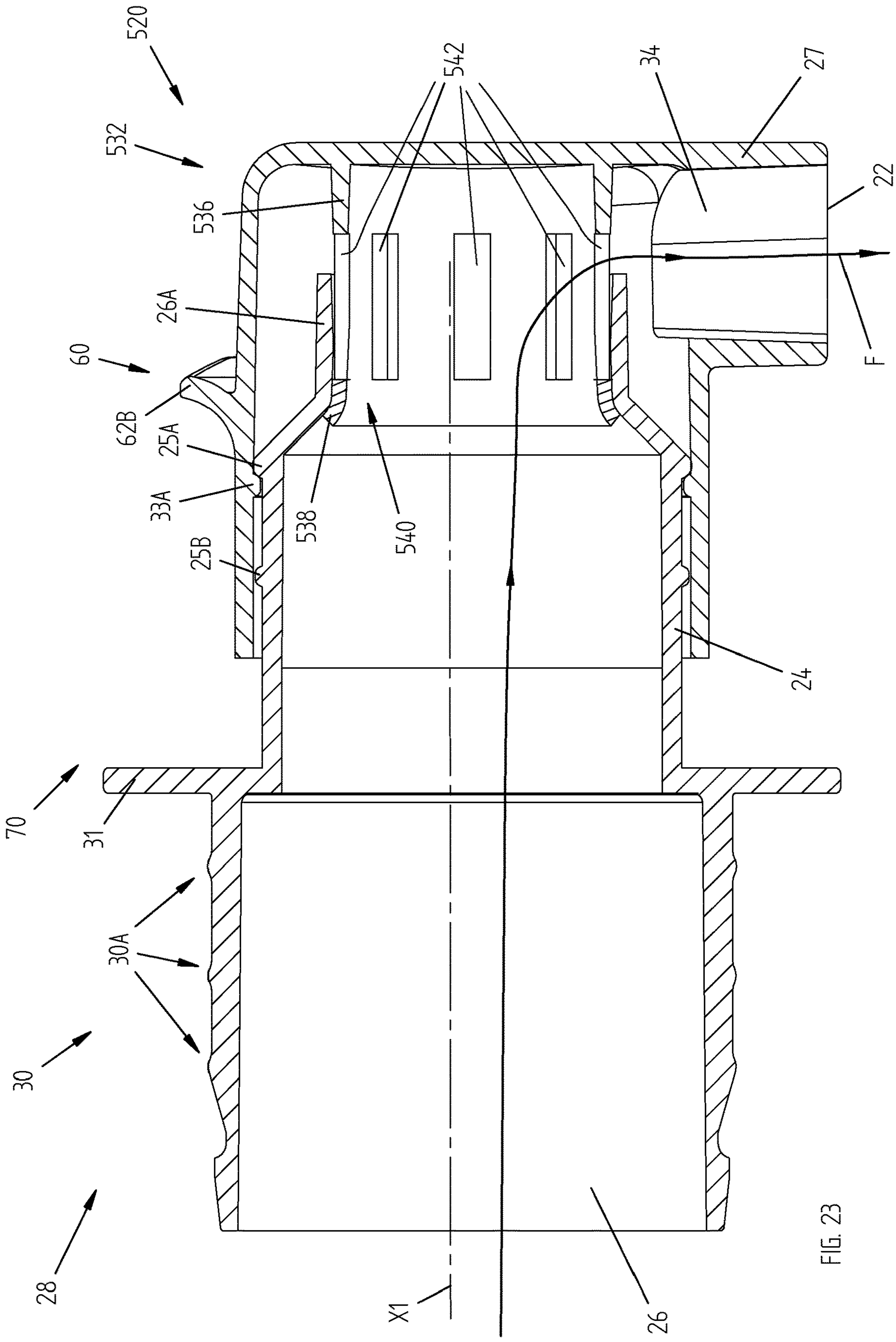
FIG. 23 shows the dispensing device of FIG. 22 in the second open operating position.
Figure 24:
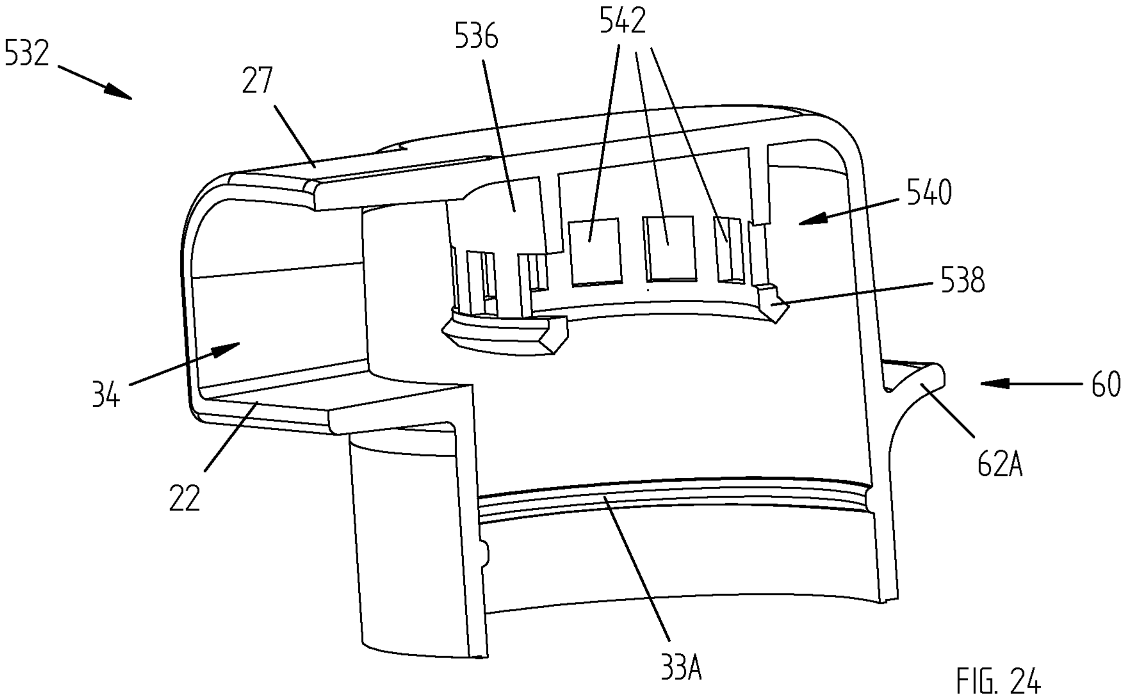
FIG. 24 shows an axonometric view of an element of the device of FIG. 22.

FIGS. 22 to 24 show another variant embodiment of the dispensing device 520 of the invention, which differs from the first embodiment described with reference to the FIGS.

1 to 14 mainly for the different configuration of the second movable body 532, more specifically of the plugging portion 536.

The component parts equivalent to those of the first embodiment previously described are identified by the same reference numbers.

The second body 532 is movable with respect to the first body 24, analogously to what has been described above, and it can preferably be positioned in a first position to close the device 520, as shown in FIG. 22, and in at least one second position, or open position, to dispense the product from the outlet mouth 22, as shown in FIG. 23. Preferably, the second movable body 532 can be translated with respect to the first body 24 in a direction away from the first body 24 to reach the open position and, vice versa, the second movable body 532 can be automatically translated with respect to the first body 24 in a direction towards the first body 24 to reach the closed position.

The translation of the second movable body 532 with respect to the first body 24 preferably takes place along the rectilinear direction X1.

The second body 532 comprises said plugging portion 536.

The plugging portion 536 is suited to close the first passage channel 26 of the first hollow body 24 when the second body 532 is in the closed position (FIG. 22) and is suited to open the first passage channel 26 when the second body 532 is in the open position (FIG. 23).

The plugging portion 536 comprises a first sealing part 538 suited to maintain the contact with the terminal section 26A of the first passage channel 26. Preferably, the first sealing part 538 comprises a flared section, more preferably made of a rigid material.

The plugging portion 536 comprises also a central part 540 provided with radial openings 542, which are better visible in FIG. 24. In the closed position, even the radial openings 542 are closed by the terminal section 26A of the first passage channel 26.

The central part 540 is at least partially yielding, so that moving from the closed position (FIG. 22) to the open position (FIG. 23) the central part 540 with radial openings 542 is deformed/dilated while the first sealing part 538 remains stationary. In the open position, at the same time, the radial openings 542 dilate and allow the product to flow along the first passage channel 26, the radial openings 542, the second passage channel 34 and finally towards the outlet mouth 22, as indicated by the arrow F in FIG. 23.

In a preferred embodiment, the first sealing part 538 and the central part 540 with the radial openings 542 of the plugging portion 536 are made in a single body, possibly through a co-moulding process with different materials to obtain the desired rigidity or elasticity of the respective parts.

Figure 25:
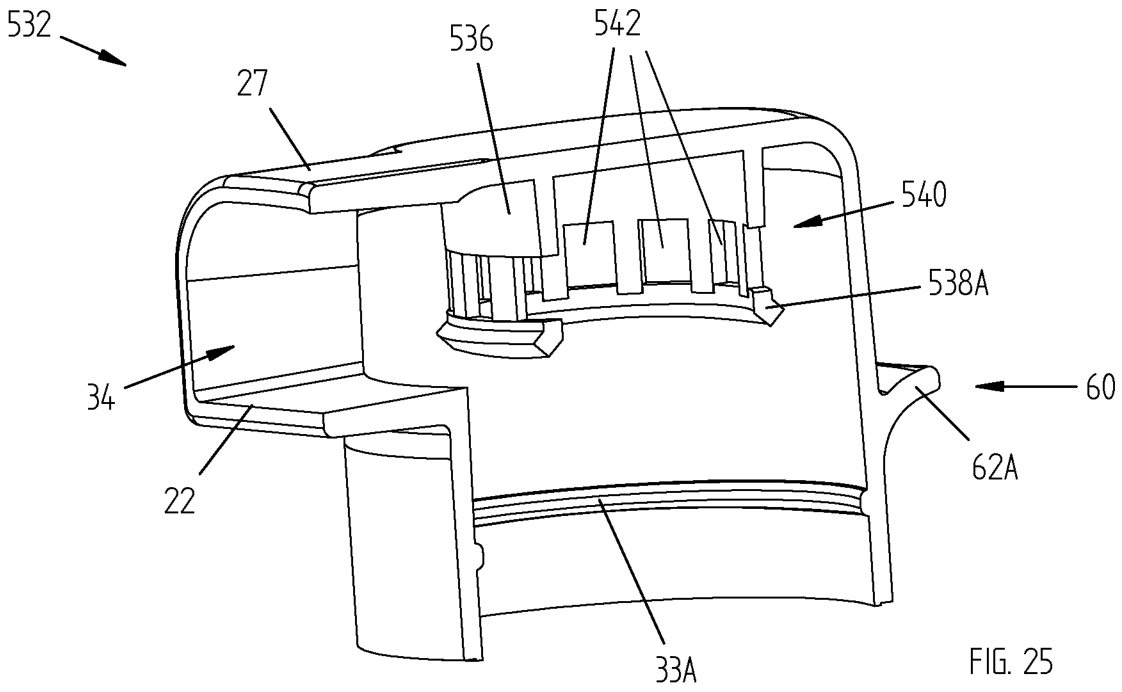
FIG. 25 shows a variant embodiment of FIG. 24.

In a variant embodiment, as shown in FIG. 25, the first sealing portion 538A, preferably in a rigid material, constitutes a separate element with respect to the elastically yielding central part 540.

During the dispensing cycle, the second body 532 is maintained in the open position (FIG. 23) by the user. At the end of the dispensing cycle the user releases the second body 532 which, under the action of the elastically yielding central part 540, returns automatically to the closed position (FIG. 22).

In the embodiment illustrated, the elastically yielding part 540 includes also the radial openings 542 which, as described above, are deformed/dilated during the opening operation. In variant embodiments, however, the radial openings can be created in a part of the plugging portion which is not elastically yielding.

Furthermore, the shape and number of the radial openings can be conveniently and preferably selected according to the required dispensing flow.

In addition to the advantages described with reference to the embodiments illustrated above, said embodiment allows the device to be closed automatically after use.

In further preferred embodiments, the automatic return to the closed position obtained by means of the elastically yielding portion 540 can be obtained through elastic means of other types, conveniently shaped and/or positioned with respect to the plugging portion. Furthermore, said elastic means can constitute a further separate and/or additional element with respect to the plugging portion.

Thus, by means of the preceding detailed description of the embodiments of the device according to the present invention illustrated in the drawings, it has been shown that the device carried out according to the present invention allows the set objects to be achieved. More specifically, the device according to the present invention makes it possible to provide a dispensing device which allows the number of components to be reduced compared to the systems of the known type. While the present invention has been illustrated above by means of the detailed description of its embodiments shown in the figures, the present invention is not limited to the embodiments represented in the drawings and described above.

On the contrary, the scope of the present invention is defined in the claims.

The invention claimed is:

1. A dispensing device for a container, said dispensing device comprising:

an outlet mouth for a product to be dispensed;

a first hollow body suited to define a first passage channel for said product and comprising connection means for connection to the container;

a second body that is movable with respect to said first body and can be positioned in a first position suited to close said dispensing device and in at least one second position suited to allow said product to be dispensed from said outlet mouth; and anti-rotation means to prevent the rotation of said second body with respect to said first body, said anti-rotation means including:

a first counteracting portion located in said first passage channel; and a second counteracting portion located at said plugging portion, the second counteracting portion extending perpendicular to the first counteracting portion, wherein said outlet mouth is defined in said second body and said outlet mouth communicates with a second passage channel for said product defined in said second body, wherein said second body comprises a plugging portion suited to close said first passage channel of said first body when said second body is in said first closing position and suited to open said first passage channel when said second body is in said second position to allow said product to flow along said first passage channel, said second passage channel and said outlet mouth, and wherein the first counteracting portion is cantilevered from the plugging portion, and wherein the second counteracting portion is cantilevered from the first body.

2. The dispensing device according to claim 1, wherein said first passage channel develops along a first longitudinal direction and said outlet mouth is positioned in said second body to allow the outflow of said product in a dispensing direction that is transverse with respect to said first direction.

3. The dispensing device according to claim 2, wherein said second passage channel develops along a second longitudinal direction that is transverse with respect to said first longitudinal direction of said first passage channel.

4. The dispensing device according to claim 1, wherein said second movable body can be translated with respect to said first body, wherein said second position for dispensing said product is obtained by translating said second movable body in a direction away from said first body and said closing position is obtained by translating said second movable body in a direction towards said first body.

5. The dispensing device according to claim 1, wherein said first passage channel and said plugging portion are both provided with at least one section in a mutually matching shape.

6. The dispensing device according to claim 1, further comprising adjusting means designed to adjust the position of said second body with respect to said first body.

7. The dispensing device according to claim 1, further comprising guide means for guiding the translation movement of said second body with respect to said first body.

8. The dispensing device according to claim 1, further comprising first manual gripping means associated with said second body and suited to favor the translation of said second body with respect to said first body carried out by a user.

9. The dispensing device according to claim 8, wherein said first gripping means comprise at least one projecting portion projecting circumferentially from said second body.

10. The dispensing device according to claim 1, further comprising second manual gripping means associated with said first body and suited to make it easier for a user to hold said first body when said second body is moved with respect to said first body.

11. The dispensing device according to claim 10, wherein said second gripping means comprise at least one projecting portion projecting circumferentially from said first body.

12. The dispensing device according to claim 1, wherein said plugging portion comprises at least one elastically yielding portion and at least one radial opening, and wherein said at least one radial opening allows the passage of said product along said first passage channel, said at least one radial opening, said second passage channel and said outlet mouth when said second body is in said second position.

13. The dispensing device according to claim 1, further comprising an intermediate connection element suited to be interposed between said first body and the container.

14. A system for dispensing a product, said system comprising:

a container for said product; and a device for dispensing said product, wherein said dispensing device is made according to claim 1.

15. The system according to claim 14, wherein said container is flexible.

16. A dispensing device for a container, said dispensing device comprising:

an outlet mouth for a product to be dispensed;

a first hollow body suited to define a first passage channel for said product and comprising connection means for connection to the container;

a second body that is movable with respect to said first body and can be positioned in a first position suited to close said dispensing device and in at least one second position suited to allow said product to be dispensed from said outlet mouth; and first manual gripping means associated with said second body and suited to favor the translation of said second body with respect to said first body carried out by a user, said first manual gripping means comprising at least one projecting portion projecting circumferentially from said second body to partially extend around the second body, wherein said outlet mouth is defined in said second body and said outlet mouth communicates with a second passage channel for said product defined in said second body, wherein said second body comprises a plugging portion suited to close said first passage channel of said first body when said second body is in said first closing position and suited to open said first passage channel when said second body is in said second position to allow said product to flow along said first passage channel, said second passage channel and said outlet mouth, wherein said first manual gripping means is located rearward of said outlet mouth, wherein the first manual gripping means is inclined forward towards the plugging portion, and wherein the at least one projecting portion includes at least two projecting portions projecting circumferentially from said second body.

17. The dispensing device according to claim 16, wherein said second body is rotatable with respect to said first body.

* * * * *